Nov. 10, 1970   J. P. NAUTA   3,539,671

METHOD FOR MAKING RESILIENTLY FACED ROLLS

Filed Feb. 1, 1968

INVENTOR.
JAN P. NAUTA

BY *Peter L. Costas*
ATTORNEY

United States Patent Office 3,539,671
Patented Nov. 10, 1970

3,539,671
METHOD FOR MAKING RESILIENTLY FACED ROLLS
Jan P. Nauta, West Hartford, Conn., assignor to Rowland Products, Incorporated, Kensington, Conn., a corporation of Connecticut
Filed Feb. 1, 1968, Ser. No. 702,470
Int. Cl. B29b 3/00; B29c 5/04, 17/12
U.S. Cl. 264—102
16 Claims

ABSTRACT OF THE DISCLOSURE

There is disclosed a method for making rolls to produce a controlled surface finish upon synthetic thermoplastic sheet material wherein a support member is inserted into the mold having an aperture or cavity of larger width and a synthetic plastic resin is introduced into the spacing therebetween in the form of a viscous fluid to form a coating on the support member. Orientation of the coating of resin is effected by relative rotation of mold and support member. The synthetic plastic is then cured and the resultant roll is used as at least one of a pair of rolls operating upon the surface of the heated thermoplastic sheet material so as to impress its surface characteristics thereupon.

Although the surface of the roll may be mirror-polished in accordance with the disclosed procedure, the rolls most advantageously produced will have solid particles dispersed in at least the surface portion of the coating for preparing a matte finish on the sheet material.

BACKGROUND OF THE INVENTION

In the extrusion and calendaring of synthetic thermoplastic sheet materials, it is frequently desirable to use at least one roll which has a relatively resilient surface in order to maintain relatively uniform pressures across the width of the sheet material and to compensate for variation in the thickness of the sheet material passing into the nip between the pair of cooperating rolls. In some instances two resiliently faced rolls may be employed although generally most applications use one relatively resilient roll with one rigid roll such as a conventional steel roll.

Such a combination involving at least one resiliently faced roll is employed not only for embossing wherein portions of the surface of the sheet material are actually to be displaced but also in polishing wherein the surface is to be rendered as mirror-smooth as possible. In embossing, the displacement and deviation from a mirror-smooth surface may be so minute as merely to provide a uniform matte finish. In operating at relatively high speeds, the need to establish uniformity of pressure and to compensate for deviation in the thickness of the sheet material becomes even greater.

There have been a number of proposals for making resiliently faced rolls. In one approach, the surface of the resilient material upon the roll may be polished, ground or otherwise mechanically or chemically treated to achieve the desired surface although not with the ultimate degree of perfection. In another approach, the surface may be developed by casting a synthetic resin coating against a female mold surface but there are very significant problems in obtaining optimum uniformity in the surface thus produced and avoiding flow lines, mold parting lines, etc.

It is an object of the present invention to provide a novel and highly effective method for producing rolls having a relatively resilient surface of the desired characteristics for finishing the surface of synthetic thermoplastic sheet material.

It is also an object to provide such a method which is relatively economical and adaptable for use in providing rolls having a relatively durable surface coating which enable production of a highly effective matte finish.

Another object is to provide a method for finishing synthetic thermoplastic sheet material by use of such rolls either singly in combination with a steel or like roll, or in pairs.

A further object is to provide improved embossing rolls having a resilient surface of uniform characteristics throughout and which is capable of long-lived operation in the finishing of synthetic thermoplastic sheet material.

SUMMARY OF THE INVENTION

It has now been found that the foregoing and related objects can be readily attained by a method in which there is initially provided a mold having a generally cylindrical aperture therein and in which there is positioned coaxially a support member having a lesser diameter than the wall of the mold defining the aperture so as to provide a spacing therebetween. A synthetic plastic resin is introduced into the space between the periphery of the support member and the wall of the mold so as to fill such spacing, and the resin is a relatively viscous fluid which forms a coating on the support member. The support member and mold are rotated relative to each other to orient the resin coating in the direction of rotation, and the resin is then subjected to conditions sufficient for setting thereof and to bond it to the surface of the support member. The support member with its bonded resin coating is then withdrawn from the mold aperture to provide a cylindrical roll body having a relatively resilient surface of synthetic plastic material adapted to impress a surface finish upon synthetic plastic sheet material. As will be discussed in detail hereinafter, the surface finish of the roll may be one which is highly polished or mirror-smooth to provide a polished surface upon the sheet material. Highly advantageously, it may be one in which at least the surface portion of the coating contains solid particles dispersed therein so that upon grinding or otherwise treating the surface to remove a portion of the resin there will be produced a multiplicity of protuberances or cavities about the surface thereof so as to emboss the surface of the sheet material with a fine or coarse matte finish. The roll will generally be hollow-cored so as to permit the passage of heat exchange fluid therethrough both to facilitate the process of manufacture thereof and to facilitate the process of surface finishing of the sheet material as will be explained in detail hereinafter. The rolls which are thus produced may be used in combination with a metal roll or they may be used in pairs so as to impart the desired surface finish upon one or both surfaces of synthetic thermoplastic sheet material passing into the nip therebetween.

Generally, the apparatus employed will include a mold having an aperture therein which may be comprised of a cylindrical tubular member. A removable cover is provided on at least one end thereof, and preferably on both ends thereof, with an aperture therein coaxial with the aperture of the mold for receiving the shaft element on a support member inserted thereinto. Inlet means is provided on the mold for introducing a fluid synthetic plastic resin into the space between the support member and the wall of the mold. A supply vessel for fluid synthetic plastic resin is connected to the inlet by conduit means, and heat exchange means are provided on the mold for raising the temperature of the fluid synthetic resin introduced into the mold aperture during operation of the apparatus and for cooling the resultant coating. A support member for producing the roll is mounted in the mold aperture and has a body portion of lesser width than the diameter of the wall of the aperture so as to provide a spacing therebetween, and the shaft elements on the ends thereof extend outwardly through the apertures in the mold covers. The support member and mold are rotatable relative to each other to effect orientation of the viscous resin coating on the support member prior to curing thereof.

DETAILED DESCRIPTION OF THE ILLUSTRATED EMBODIMENTS

Figure 1:
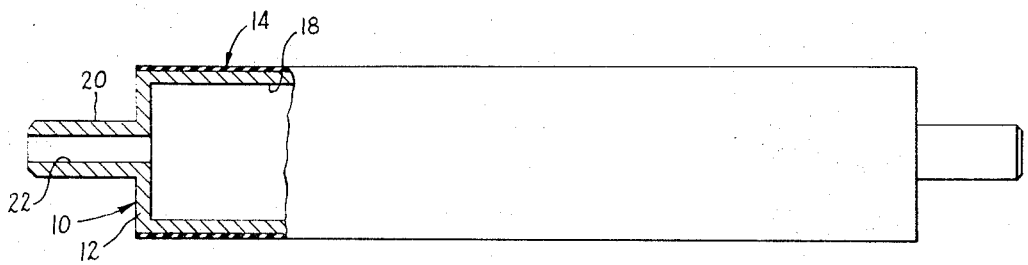
FIG. 1 is a front elevational view of a roll embodying the present invention with a portion thereof in section to reveal internal construction.
Figure 2:
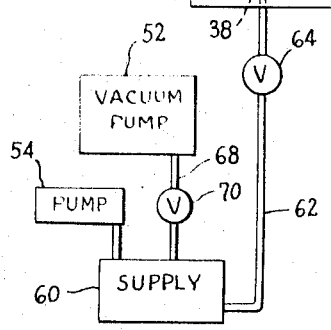
FIG. 2 is a fragmentary sectional view thereof to a greatly enlarged scale.

Turning first to FIGS. 1 and 2 of the attached drawings, therein illustrated is a matte finishing roll for use in the present invention consisting of a metal support member generally designated by the numeral 10 and having about its cylindrical body portion 12 a coating of relatively resiliently deformable material generally designated by the numeral 14 with a multiplicity of closely spaced solid particles 16 therein. A primer coating 15 is illustrated in exaggerated thickness. As best seen in FIG. 1, the cylindrical body portion 12 of the support member 10 is hollow providing a chamber 18 therein for receiving a heat exchange fluid, and the shaft elements 20 extending coaxially outwardly from the ends thereof for mounting in a roll stand (not shown) have passages 22 extending therethrough communicating with the chamber 18 for passage of the fluid therethrough.

Figure 3:
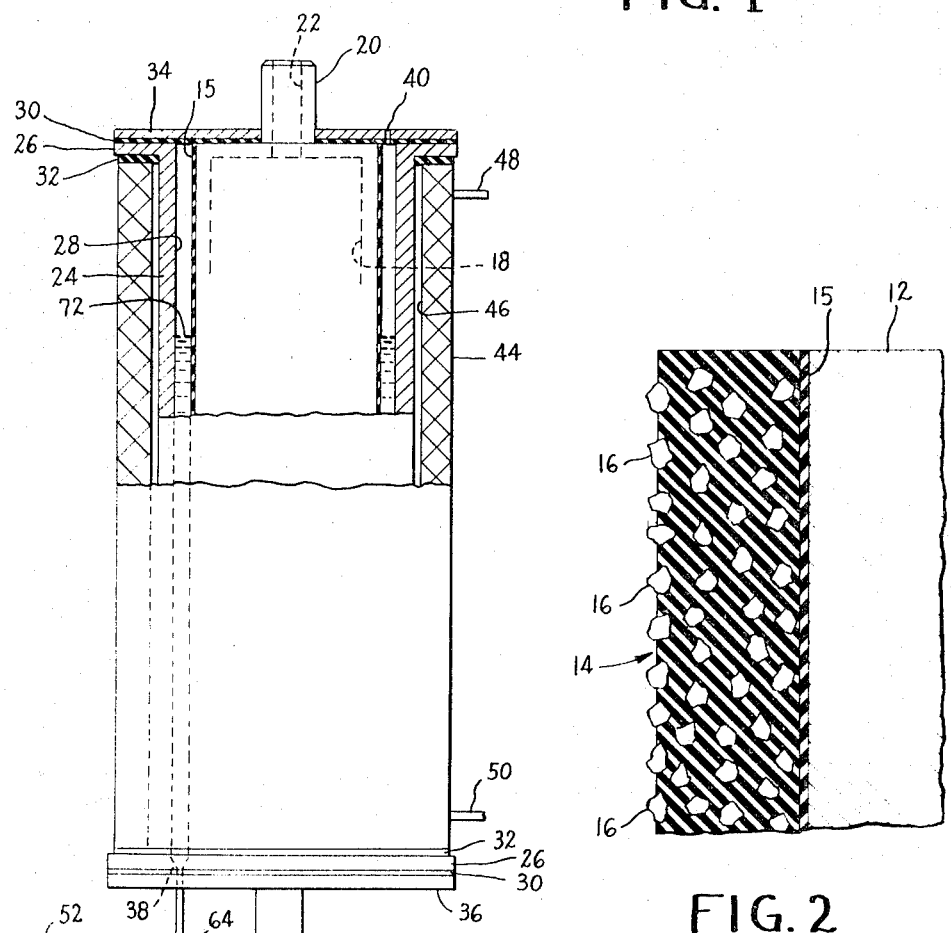
FIG. 3 is a semi-diagrammatic representation of apparatus employed in the present invention with portions thereof broken away to reveal internal construction and showing fluid synthetic plastic material being introduced thereinto during one stage of the operation of the present invention.

Turning now to FIG. 3, therein is semidiagrammatically illustrated apparatus and the method for making the rolls used in the present invention. A suitable mold assembly is provided by a cylindrical mold 24 having radially outwardly extending flanges 26 at the ends thereof and providing a cylindrical aperture 28 therein. The metal support member 10 is supported coaxially within the mold aperture 28 and has its body portion 12 of lesser diameter than the diameter of the wall of the mold defining the aperture 28 so as to provide an annular spacing thereabout. Top and bottom covers 34, 36 close the mold aperture 28 and are secured to the mold flanges 26 by fasteners (not shown) seated in cooperating apertures therein. The bottom cover 36 has a feed aperture 38 registering with a large portion of the annular space in the cavity 28.

The shaft elements 20 on the metal support member 10 extend outwardly through apertures in the covers 34, 36 and seals 30 are provided between the cooperating surfaces of the covers 34, 36 and the metal support member 10 to prevent fluid from leaking from the annular spacing about the ends of the body portion 12. A tubular jacket 44 extends about the mold 24 and is of greater internal diameter than the mold so as to provide an annular cavity 46. Seals 32 are provided between the ends of the jacket 44 and the flanges 26 so as to seal the ends of the cavity 46. An inlet tube 48 and an outlet tube 50 adjacent the ends of the jacket 44 provide for flow of heat exchange fluid through the cavity 46.

To permit air to escape a vent 40 is provided in the top cover 33. As diagrammatically illustrated in FIG. 3, synthetic plastic resin is fed by the pump 53 from the supply vessel 60 into the annular space through the supply line 62 which has a valve 64 therein. A line 68 from the vacuum pump 52 permits evacuation of air from the supply vessel 60 upon opening of the valve 70 and closing of the cover of supply vessel 60.

In the practice of the present invention utilizing the apparatus diagrammatically illustrated in FIG. 3, a support member 10 is cleaned and mounted in the mold 24. Desirably, the surface of the body portion 12 has been treated with a primer to form a thin coating 15 thereon for facilitating adhesion thereto as shown in exaggerated thickness in FIG. 3. By first applying a primer coating to the support member 10, a resin which will bond to the primer only may be used so as to minimize the need for applying a release coating to the surface of the male mold 24.

A volume of the synthetic plastic resin in the supply vessel 60 is placed under vacuum by the vacuum pump 52 through the line 68 opening the valve 70 so as to extract air from the body thereof. After removal of air from the resin, the vacuum is discontinued by closing the valve 70. In this manner, a porosity-free material may be obtained. The pump 54 may then be used to convey resin from the vessel 60 through the line 62 into the annular space between the support member 10 and the mold 24 through the line 62 by opening the valve 64 and allowing air to escape through the vent 40. This stage is shown in FIG. 3.

After filling of the annular space in the mold 24, the valve 62 is closed, and windows (not shown) of synthetic plastic or glass may be provided in the mold 24 to observe proper filling. The cylindrical mold 24 is rotated several times about the support member 10 by turning the upper flange 26 in order to ensure proper distribution of the resin 72 and orientation of the solid particles 16 in the direction of roll rotation.

The resin 72 is then cured by introducing a heated fluid into the cavity 46 of the jacket 44 from a suitable source (not shown) through the inlet tube 48. To expedite curing, the heated fluid is also introduced into the chamber 18 of the support member 10 through the passage 22 in the upper shaft element 20 by a coupling (not shown). The fluid is returned to the source by couplings (not shown) attached to the outlet tube 50 and lower shaft element 20.

After subjection to heat for the necessary time, the flow of heated fluid is discontinued and the mold assembly is cooled. Cold water is introduced into the cavity 46 and chamber 40 from a suitable source (not shown) in the same manner as the heated fluid to cause the resin which has set and bonded to the support member 10 to shrink away from the wall of the mold 24. The top cover 34 is then removed and the male mold support member 10 is withdrawn from the cylindrical aperture 28. The cured resin provides a coating 14 having a multiplicity of solid particles 16 therein as seen in FIG. 2.

Various types of synthetic resins may be utilized for generating the resilient surface coating upon the roll including silicone rubbers, polyurethanes and synthetic rubbers such as polybutadienes and interpolymers of butadiene with other ethylenically unsaturated monomers such as styrene, acrylonitrile, acrylates and methacrylates, polyisoprenes, ethylenes/propylene terpolymers, etc. Generally, the resins should have a durometer of 50–100 on the "Shore A" scale, and preferably about 60–85. The resins which have proven to be particularly advantageous from the standpoint of durability, desired durometer, facility of molding and temperature resistance are the silicones. Exemplary of silicone compositions which have been employed are those manufactured by Dow-Corning and specifically that sold under the trademark Sylgard 182 and those manufactured by General Electric Company and specifically those sold under the designations RTV 615 and RTV 630. The particular polymer and even the characteristics of a given polymer will vary with the desired application and durometer. The resin should be one which cures to a relatively non-porous surface and should possess a fairly high degree of solvent resistance. As will be pointed out hereinafter, resins which have a relatively high coefficient of thermal expansion are advantageous from the standpoint of ease of fabrication.

The time for curing or setting of the resin will vary with the particular resin selected, as will the temperature. Generally, these factors are readily available from the specifications of the particular manufacturer for the given product. Resins which cross-link should be allowed to thoroughly cure before use so as to avoid any deteriorating effect upon the surface of the synthetic resin coating upon the product roll.

It is sometimes desirable to fabricate the thickness of the coating on the roll from two layers of different resins so as to obtain the overall properties in the coating. For example, the underlying layer may be relatively resilient and the overlying layer may be relatively rigid with the composite providing the desired degree of resiliency. In addition, the durometer of a particular resin may be increased through the use of fillers as is well known.

To ensure complete adhesion of the resin to the surface of the support member, the surface of the underlying metal should be cleaned thoroughly to remove grease and dirt and desirably coated with a primer suitable for the particular resin employed. Primers have proven particularly advantageous with the silicone resins and the manufacturers thereof offer suitable primers for their several products.

The primers may be applied in any suitable manner including brushing, rolling, spraying or the like. If so desired, the support member may also be rotated through a bath of the primer material. The thickness of the primer will vary with the effectiveness thereof and the recommendations of the individual manufacturer to obtain optimum benefits therefrom. In some instances, the primer may be precured depending upon the chemical composition thereof and the recommendations of the manufacturer.

The support member with the coating thereon may be removed from the mold in any suitable manner by cooling of the mold and coating to effect thermal contraction of the resin sufficiently to enable facile removal from the mold. This thermal contraction may be enhanced by causing the resin to set and cure at an elevated temperature producing a high degree of thermal expansion during curing. Obviously, the thickness of the resin coating will also vary the amount of reduction in outer diameter of the coating.

Initially, the resin in the mold may be heated to a temperature somewhat below that at which rapid setting will occur so as to produce substantially all the expansion of the resin while it is still fluid, thus allowing the fluid resin to displace within the mold cavity without applying great pressures to the surfaces of the mold and support member and avoiding flow of the solidified resin. Thereafter, the temperature of the resin may be increased to produce expansion of the solidified resin and to offset the shrinkage which occurs during solidification or setting thereof. The temperatures and times will vary with the particular resins employed as is well known in the art. Thereafter, the resin may be held at the same or a somewhat higher temperature for curing in the assembly, or the parts may be separated and a much higher temperature imparted thereto to effect curing in a shorter period of time. In a more facile version of the process, the resin is rapidly heated to an elevated curing temperature before substantial solidification can take place. In this manner, the solidification occurs simultaneously with the thermal expansion of the resin.

The thickness of the coating on the support member to provide the roll should be sufficient to provide the desired degree of resiliency but should not be so thick so as to prevent reasonably efficient heat transfer therethrough. Generally, the thickness of the coating for the roll will be on the order of $1/16$ to 1 inch preferably on the order of $7/32$ to $1/2$ inch.

As previously indicated, it is sometimes desirable to form the coating in two layers so as to provide an underlayer of one characteristic and an outer layer of different characteristics. This is particularly advantageous when it is desirable to increase the area of contact between the surface of the roll and the strip passing into the nip therebetween, thus enabling the contact pressure to be decreased to increase the life of the roll. For example, in forming a matte finishing roll, a resin having a durometer of about 65–75 on the Shore A scale is utilized to provide an undercoating of about $1/4$ to $1/2$ inch. Thereafter, a top layer containing solid particles is cast thereon which demonstrates a durometer of about 88–92 on the Shore A scale and has a thickness of about $1/16$ to $3/16$ inch. The softer underlayer enables the surface of the roll to flatten out at the roll nip while at the same time providing a durable grit-filled coating. After casting the grit-filled surface is ground so as either to expose portions of the solid particles or to dislodge the solid particles, thus providing an uneven surface for producing the matte finish.

In making a polishing roll, it is desirable to use an underlayer of relatively high durometer and a top layer of somewhat lower durometer. Thus, an underlayer coating containing finely divided solid particles may provide a durometer of about 90 on the Shore A scale and may be utilized in a thickness of about $5/16$ inch. A top layer of a resin having a durometer of about 55 on the Shore A scale is then cast thereon in a thickness of about 0.010 inch.

In making matte finishing rolls, it is necessary to grind off or otherwise treat the surface of the roll as cast in order to cause the solid particles to provide the desired roughness. This may involve grinding to dislodge some of the solid particles in the coating and provide cavities or to remove the resin between solid particles so that portions of solid particles project outwardly from the surface of the resin. In either event, a rough surface is produced which will provide a matte finish upon the surface of the synthetic plastic material.

Normally about $1/16$ to $1/8$ inch of the surface of the grit-filled roll will be ground or otherwise treated to provide sufficient roughness. Whether the solid particles will be dislodged from the resin or whether the resin will be ground down about the particles will be dependent upon the degree of bonding between the solid particles and the resin and also upon the hardness of the particles. Bonding of the solid particles to the resin may be enhanced as hereinafter pointed out.

The size of the solid particles may vary considerably depending upon the coarseness desired for the surface of the roll and also upon the desired durometer for the coating. Generally, the grit may vary from as large as minus 70 mesh (British sieve) to as small as minus 2600 mesh. The amount of solid particles which may be incorporated within the resin will also vary with the size thereof. For example, when using 400 mesh particles, a suitable coating is formed by a mixture of 125 parts of the solid particles and 100 parts of the resin. When using particles of 70 mesh, 180 parts of solid particles may be used in combination with 100 parts of resin.

The solid particles employed generally are of a hard, abrasive nature so as to be relatively resistant to wear. Among the materials which can be used are silicon carbide, silicon oxide, aluminum oxide, aluminum carbide and the natural ores alundum, corundum, etc. If so desired, other materials may be used such as glass chips, glass beads, metal chips, stone chips, glass microballoons, etc. To enhance the bonding of the solid particles in the resin, they may be initially pretreated with a primer.

In making a two-layer coating, it is generally most convenient to use the same mold for forming both layers. The material forming the underlayer is initially introduced into the mold cavity and provides a coating substantially completely filling the annular spacing. The support member is removed from the mold cavity, ground sufficiently to remove the desired amount thereof to provide for the top layer and then it is reintroduced into the mold cavity. When utilizing this technique, the heat exchange fluid is introduced into the support member initially to elevate the temperature of the underlayer while retarding the elevation of the temperature of the liquid resin surrounding it. A certain amount of the expansion of the liquid resin will also take place. The temperature of the heat exchange medium supplied to the mold jacket and to the support member is further increased to complete the expansion of the liquid resin and to produce the initial solidification thereof. As the solidification of the liquid resin occurs, the heat is still further increased rapidly to produce complete curing of the top coating and compensate for shrinkage during solidification. Generally, maintenance at a temperature of about 200° Fahrenheit for 2 hours is sufficient to effect full curing of a silicone coating.

In order to obtain a homogeneous coating which is free from defects, the resin should be screened to remove occluded dirt and occluded particles and should also be subjected to vacuum, preferably with agitation or other means for exposing different portions thereof, in order to remove any other gases and volatile components. A vacuum on the order of one to three millimeters mercury for fifteen minutes to two hours is most desirably employed.

Since the synthetic plastic resin is normally highly viscous, flow in the relatively narrow annular spacing of the mold cavity will often be relatively non-uniform and produce flow lines in the coating of the viscous resin formed upon the support member. Such flow lines would produce highly undesirable defects in the surface of the sheet material treated with the resultant roll body. Accordingly, it has been found extremely advantageous to rotate the support member and the mold relative to each other to eliminate such flow lines and orient the resin of the female mold impression in the direction of roll rotation.

Exemplary of the efficacy of the present invention are the following specific examples.

EXAMPLE 1

A mold assembly substantially as illustrated in the attached drawings was employed and provided a mold cavity having an inside of about 5¾ inches and an axial length of about 64 inches. The surface of the mold cavity was cleaned and then coated with a wax solution to provide a release agent. A support member having a cylindrical body portion and shaft elements extending outwardly therefrom was supported coaxially within the mold cavity after having its surface cleaned and treated with a primer sold by Dow-Corning under the designation Sylgard. The diameter of the body portion of the support member was 5⅛ inches and its axial length was 60 inches.

A volume of a silicone resin mixture was prepared by admixing 70 parts by weight of a silicone resin sold by General Electric Company under the designation RTV-630, and 30 parts by weight of a silicone resin sold by Dow-Corning under the designation Sylgard-182. Admixed with 94 parts by weight of this resin mixture were 120 parts by weight of corundum of 100 mesh size sold by American Abrasive under the trade name Herkulon and 36 parts by weight of silicon carbide of 400 mesh size. Just immediately prior to introduction of the mixture into the supply vessel, 9.4 parts by weight of a curing agent sold by General Electric Company under the designation 630–B were introduced thereinto.

The mixture of grit and resin was then subjected to a vacuum of about 2 torrs for a period of about 1 hour to remove air and other occluded gas. The vacuum was then discontinued and a pressure of about 27 p.s.i.g. was applied to the supply vessel to transport the resin-abrasive mixture into the annular space in the mold cavity about the support member, the volume introduced being sufficient to fill substantially the entire height of the cavity. The support member and the mold were then rotated relative to each other several times to effect orientation of the solid particles and the resin of the coating substantially in the direction of roll rotation and to eliminate axial flow lines therein.

Heat exchange fluid was then introduced into the mold jacket and into the support member at a temperature of about 200° Fahrenheit and flow was continued for a period of about 2 hours to effect complete curing of the silicone resin. The heat exchange fluid was then lowered in temperature to about 45° Fahrenheit and the cover of the mold assembly removed. About 250 cc. of denatured alcohol were introduced into the space between the resin coating and the wall of the mold to facilitate separation thereof as a lubricant. The support member was then withdrawn from the mold cavity and ground so as to remove approximately ⅛ inch from the diameter thereof. As a result of the grinding operation, portions of the grit particles were exposed since the resin was more readily ground and thus provided a surface of irregular contour but substantially uniform throughout the length and circumference thereof. The resultant coating was found to have a durometer of about 90 on the Shore A scale.

The matte finishing roll thus produced was mounted on a roll stand in cooperation with a steel roll having an outside diameter of about 8 inches to define a roll nip therebetween. Polycarbonate sheeting issuing from an extruder was passed into the nip therebetween and brought about the outside surface of the steel roll so as to minimize dwell time in contact with the grit-filled roll and the degree of flow of the polycarbonate resin about the surface of the grit particles. The resultant polycarbonate sheet material was found to have a uniform mirror surface upon one side and a highly desirable pleasant matte surface upon the other side which was highly resistant to scratching.

EXAMPLE 2

The procedure of Example 1 was substantially repeated for purposes of making a mirror finish roll by use of a mold having a highly polished internal surface. The resin employed in this particular procedure was a silicone resin sold by General Electric Company under the designation RTV–630 and contained 10 percent by weight, based upon the weight of the resin, of a curing agent sold by General Electric Company under the designation 630–B.

After rotation of the mold and support member several times relative to each other, the heat exchange fluid at a temperature of 200° Fahrenheit was introduced into the mold jacket and into the support member to effect complete curing of the resin coating. After removal of the support member from the mold cavity, the coating was found to be mirror-smooth and to have a durometer of about 28 on the Shore A scale.

This roll was assembled in a roll stand together with a steel polishing roll of about 8 inches in diameter to define a roll nip therebetween. Polycarbonate sheet material issuing from an extruder was passed into the roll nip and wrapped about the metal roll. The resultant sheet material was found to be highly polished on both surfaces thereof.

Having thus described the invention, I claim:

1. In a method for making a roll for producing a surface finish upon thermoplastic sheet material, the steps comprising: providing a mold having a generally cylindrical cavity therein; positioning a support member in said cylindrical cavity coaxial therewith, said support member being of lesser width than the diameter of the wall defining said cylindrical cavity so as to provide an annular space therebetween; introducing into said space a synthetic plastic resin which flows axially along and substantially fills said annular space, said resin being a relatively viscous fluid at the time of introduction and forming a cylindrical coating on said support member, said resin being curable to a relatively resilient polymer; rotating said mold and said support member with said coating thereon relative to each other about the axis of said cylindrical cavity several times to orient the portion of the said coating adjacent said mold wall in the direction of rotation and eliminate any flow lines therein, said rotation being prior to substantial setting and curing of said resin; and subjecting said synthetic plastic resin of said coating to conditions sufficient to cure said synthetic plastic resin and produce bonding thereof to said support member; and removing said support member with said bonded coating thereon from said mold cavity to provide a cylindrical roll body having a relatively resilient surface of synthetic plastic material adapted to impress a surface finish upon synthetic plastic material.

2. The method of claim 1 wherein said cylindrical roll body has a multiplicity of solid particles dispersed substantially uniformly throughout at least the surface portion thereof.

3. The method of claim 2 wherein said surface coating is subsequently ground to provide a non-uniform surface by reason of the differential action of the grinding upon the solid particles and resin for producing a matte finish upon synthetic plastic sheet material.

4. The method of claim 3 wherein the action of grinding dislodges solid particles at the surface to provide cavities into which the synthetic plastic of the sheet material may flow to produce the matte surface.

5. The method of claim 1 wherein said mold member has a highly polished surface and wherein the resultant surface of the coating on the support member is highly polished.

6. The method of claim 1 wherein said mold and said coating upon said support member are cooled from an elevated temperature to effect shrinkage of the resin thereof and facilitate separation of the coating from the mold and removal of the support member therefrom.

7. The method of claim 1 wherein said synthetic plastic resin comprises a silicone resin.

8. The method of claim 1 wherein the fluid synthetic plastic resin is initially subjected to a vacuum to remove air and other gas therefrom.

9. The method of claim 1 wherein the surface of the support member is initially treated with a primer to facilitate adherence of the resin thereto.

10. The method of claim 1 wherein a release agent is initially applied to said wall of the mold to prevent adherence of the subsequently introduced synthetic plastic resin thereto.

11. The method of claim 1 wherein the support body introduced into the mold has an initial coating of synthetic plastic resin of different characteristics than that of the synthetic plastic resin introduced as a coating thereon to provide a composite coating.

12. The method of claim 11 wherein the resin of said initial coating has a relatively high degree of resiliency and the resin applied thereonto contains solid particles to provide a surface layer of relatively lesser resiliency.

13. The method of claim 11 wherein the resin of said initial coating contains solid particles to provide a portion having a relatively lesser degree of resiliency and the resin applied thereonto has a relatively high degree of resiliency, said outer coating having a highly polished surface.

14. In the method of making synthetic thermoplastic sheet material with a closely controlled surface finish, the steps comprising: providing a mold having a cylindrical cavity therein; supporting coaxially in said cavity a generally cylindrical support member of lesser diameter than the wall of said mold defining said cavity so as to provide an annular space therebetween; introducing a fluid synthetic plastic resin into said cavity which resin flows axially along said space between said support member and the wall of said mold and substantially fills said space, said resin being a relatively viscous fluid at the time of introduction and forming a cylindrical coating on said support member, said resin being curable to a relatively resilient polymer; rotating said mold and said support member with said coating thereon relative to the axis of said cylindrical cavity several times to orient the portion of said coating adjacent said mold wall in the direction of rotation and eliminate any flow lines therein, said rotation being prior to substantial setting and curing of said resin; subjecting said synthetic plastic resin to conditions sufficient to cure said synthetic plastic resin and bond said resin to said support member, said synthetic plastic resin upon curing being relatively durable and closely conforming to the surface of said mold thereof; removing from the mold said support member with said synthetic plastic resin coating to provide a generally cylindrical roll body having a relatively resilient seamless coating; mounting said roll body on a roll support together with a second roll body to provide a roll nip therebetween and passing a length of heated synthetic thermoplastic sheet material through said nip to produce flow of said thermoplastic material and to produce a controlled surface pattern upon said length after passage through said nip.

15. The method of claim 14 wherein said cylindrical roll body has a multiplicity of solid particles dispersed substantially uniformly throughout at least the surface portion thereof and is subsequently ground to provide a non-uniform surface by reason of the differential action of the grinding upon the solid particles and resin, and wherein said thermoplastic sheet material is provided with a uniform matte finish upon the surface in contact with said roll body.

16. The method of claim 15 wherein the action of grinding dislodges solid particles at the surface to provide cavities into which the synthetic plastic of the sheet material may flow to produce the matte surface.

References Cited
UNITED STATES PATENTS

| | | | |
|---|---|---|---|
| 2,263,285 | 11/1941 | Bolog | 264—310 X |
| 2,388,880 | 11/1945 | Stitt | 264—162 X |
| 2,985,916 | 5/1961 | Reuter | 264—317 |
| 3,097,080 | 7/1963 | Weir | 264—162 X |
| 3,222,439 | 12/1965 | Bolomey | 264—312 X |
| 3,222,443 | 12/1965 | Dames | 264—313 |
| 3,263,273 | 8/1966 | Pickels | 264—312 |
| 3,356,242 | 12/1967 | Cleereman | 264—310 X |
| 3,378,617 | 4/1968 | Elmendorf | 264—162 |

ROBERT F. WHITE, Primary Examiner

A. M. SOKAL, Assistant Examiner

U.S. Cl. X.R.

264—108, 162, 226, 265, 284, 310